United States Patent
Nagori (10) Patent No.: US 8,238,427 B2
(45) Date of Patent: Aug. 7, 2012

(54) RATE DISTORTION OPTIMIZED ADAPTIVE INTRA REFRESH FOR VIDEO CODING

(75) Inventor: Soyeb N. Nagori, Bangalore (IN)

(73) Assignee: Texas Instruments Incorporated, Dallas, TX (US)

(*) Notice: Subject to any disclaimer, the term of this patent is extended or adjusted under 35 U.S.C. 154(b) by 728 days.

(21) Appl. No.: 12/356,262

(22) Filed: Jan. 20, 2009

(65) Prior Publication Data
US 2009/0190661 A1    Jul. 30, 2009

Related U.S. Application Data

(60) Provisional application No. 61/021,782, filed on Jan. 17, 2008.

(51) Int. Cl.
*H04N 7/12* (2006.01)

(52) U.S. Cl. ........... 375/240.13; 375/240.2; 375/240.16; 375/240.27; 348/42

(58) Field of Classification Search ............... 375/240, 375/240.01, 240.12–13, 130–153, 240.24, 375/240.29; 704/500–504
See application file for complete search history.

(56) References Cited

U.S. PATENT DOCUMENTS

| | | | | |
|---|---|---|---|---|
| 5,610,659 A * | 3/1997 | Maturi et al. | ............ | 375/240.24 |
| 6,014,181 A * | 1/2000 | Sun | ............... | 348/699 |
| 2004/0146109 A1* | 7/2004 | Kondo et al. | ............ | 375/240.16 |
| 2006/0104366 A1* | 5/2006 | Huang et al. | ............ | 375/240.27 |
| 2007/0044010 A1* | 2/2007 | Sull et al. | .................... | 715/500.1 |
| 2007/0098078 A1* | 5/2007 | Kim et al. | .............. | 375/240.24 |
| 2008/0069211 A1* | 3/2008 | Kim et al. | .............. | 375/240.13 |
| 2008/0291995 A1* | 11/2008 | Graham et al. | .......... | 375/240.02 |
| 2009/0097560 A1* | 4/2009 | Robertson | ................ | 375/240.16 |
| 2011/0075735 A1* | 3/2011 | Drezner | .................... | 375/240.13 |

* cited by examiner

*Primary Examiner* — Christopher Brown
*Assistant Examiner* — Fahimeh Mohammadi
(74) *Attorney, Agent, or Firm* — Robert D. Marshall, Jr.; Wade James Brady, III; Frederick J. Telecky, Jr.

(57) ABSTRACT

A method of video coding comprising Intra prediction coding at least a predetermined constant M macroblocks within an ordinary frame. These M macroblocks include naturally selected macroblocks where the bit cost of Intra prediction coding is less than for Inter prediction coding and optional additional macroblocks. The optional additional macroblocks have the least bit cost of Inter prediction coding as adjusted by a penalty factor each time a corresponding macroblock is Intra coded in a predetermined number of frames. An end frame Intra prediction codes each macroblock having no corresponding Intra prediction coded macroblock in a predetermined number of ordinary frames.

3 Claims, 7 Drawing Sheets

(1) L1I CACHE MISS FILL FROM L2
(2) L1D CACHE MISS FILL FROM L2
(3) L1D WRITE MISS TO L2, OR L1D VICTIM TO L2, OR L1D SNOOP RESPONSE TO L2
(4) L2 CACHE MISS FILL, OR DMA INTO L2
(5) L2 VICTIM WRITE BACK, OR DMA OUT OF L2
(6) DMA INTO L2
(7) DMA OUT OF L2

RATE DISTORTION OPTIMIZED ADAPTIVE INTRA REFRESH FOR VIDEO CODING

CLAIM OF PRIORITY

This application claims priority under 35 U.S.C. 119(e)(1) to U.S. Provisional Application No. 61/021,782 filed Jan. 17, 2008.

TECHNICAL FIELD OF THE INVENTION

The technical field of this invention is video encoding for data compression.

BACKGROUND OF THE INVENTION

Intra refresh (IR) is an efficient error concealment tool used in video encoding for noisy channel environment. In situations where valid temporal reference(s) are lost in transmission, IR helps in reconstructing the video by correctly reproducing Intra coded macroblocks. The absence of temporal references in Intra coded macro-blocks makes this possible. In contrast, correct reproduction of Inter coded macroblocks requires temporal references.

The IR error concealment capability comes with the cost of decreasing coding efficiency. The Inter macroblocks exploit temporal redundancy to achieve better coding efficiency. Such temporal redundancy is not used for Intra coded macroblocks. The prior art uses IR by cyclically or randomly, coding a fixed number of Intra macroblocks in each frame. Video sequences with no motion or low motion content typically include many macroblocks which do not generate any residual energy or generate very small residual energy. These macroblocks can be Inter coded at an acceptable level of fidelity using very few bits. If these macroblocks are Intra coded due to IR constrains, they consume a larger number of bits to achieve the same fidelity. On a set of typical video sequences simulations show loss of more than 0.5 db in perceived signal to noise ratio (PSNR) due to using IR. This expected loss is significantly more for non-typical video sequences having no or low motion.

Thus Intra refresh (IR) causes a 0.5 to 0.65 db degradation in PSNR due to inefficient coding type for forced Intra macroblocks. This degradation is greater in low motion video sequences. Customers perceive poor subjective quality with any non-random IR scheme. Thus there is a need in the art for an efficient IR strategy which improves objective and subjective quality. This should be comparable with cyclic refresh IR from the perspective of error concealment capability.

SUMMARY OF THE INVENTION

This invention reduces the loss in quality which comes from IR constrains. This invention intra prediction codes at least a predetermined constant M macroblocks within an ordinary frame. These M macroblocks include naturally selected macroblocks where the bit cost of intra prediction coding is less than for inter prediction coding and optional additional macroblocks. The optional additional macroblocks have the least bit cost of inter prediction coding as adjusted by a penalty factor each time a corresponding macroblock is intra coded in a predetermined number of frames. This uses a correlation between differential RD cost with Inter RD cost to select macroblocks for Intra coding. An end frame Intra prediction codes each macroblock having no corresponding Intra prediction coded macroblock in a predetermined number of ordinary frames.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
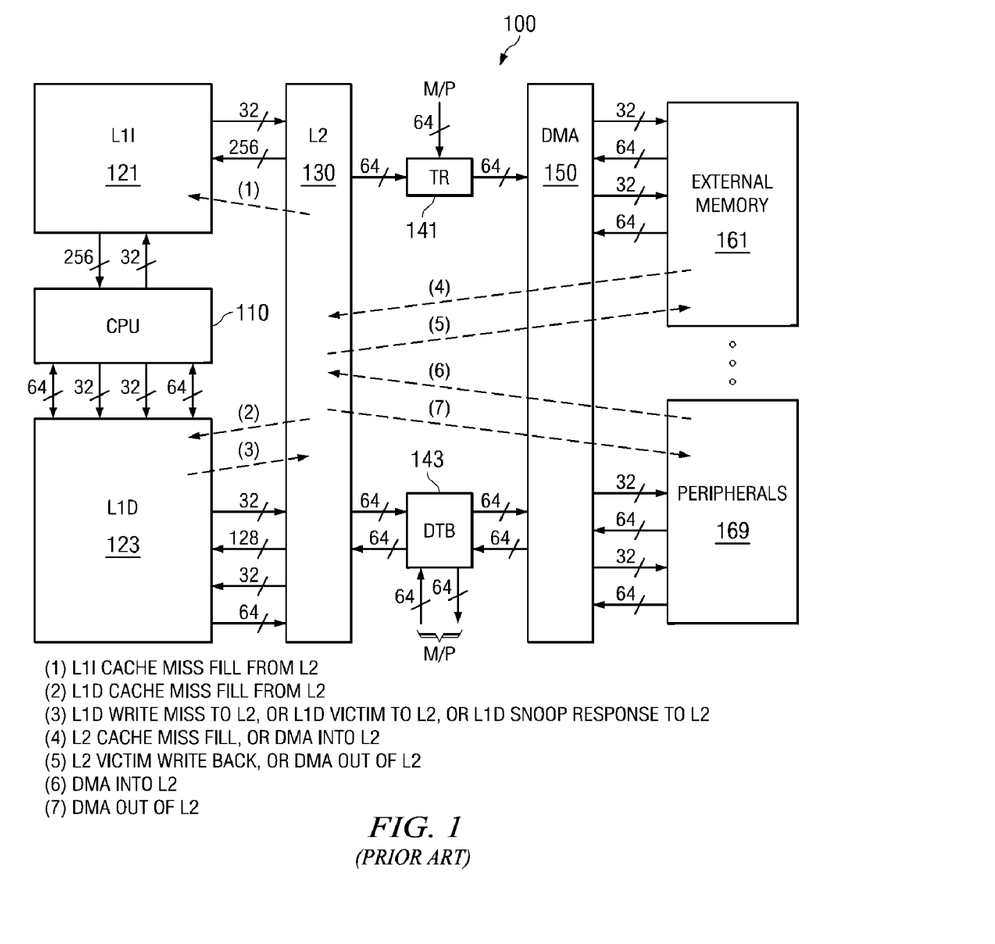
FIG. 1 illustrates the organization of a typical digital signal processor to which this invention is applicable (prior art)

FIG. 1 illustrates the organization of a typical digital signal processor system 100 to which this invention is applicable (prior art). Digital signal processor system 100 includes central processing unit core 110. Central processing unit core 110 includes the data processing portion of digital signal processor system 100. Central processing unit core 110 could be constructed as known in the art and would typically includes a register file, an integer arithmetic logic unit, an integer multiplier and program flow control units. An example of an appropriate central processing unit core is described below in conjunction with FIGS. 2 to 4.

Digital signal processor system 100 includes a number of cache memories. FIG. 1 illustrates a pair of first level caches. Level one instruction cache (L1I) 121 stores instructions used by central processing unit core 110. Central processing unit core 110 first attempts to access any instruction from level one instruction cache 121. Level one data cache (L1D) 123 stores data used by central processing unit core 110. Central processing unit core 110 first attempts to access any required data from level one data cache 123. The two level one caches are backed by a level two unified cache (L2) 130. In the event of a cache miss to level one instruction cache 121 or to level one data cache 123, the requested instruction or data is sought from level two unified cache 130. If the requested instruction or data is stored in level two unified cache 130, then it is supplied to the requesting level one cache for supply to central processing unit core 110. As is known in the art, the requested instruction or data may be simultaneously supplied to both the requesting cache and central processing unit core 110 to speed use.

Level two unified cache 130 is further coupled to higher level memory systems. Digital signal processor system 100 may be a part of a multiprocessor system. The other processors of the multiprocessor system are coupled to level two unified cache 130 via a transfer request bus 141 and a data transfer bus 143. A direct memory access unit 150 provides the connection of digital signal processor system 100 to external memory 161 and external peripherals 169.

Figure 2:
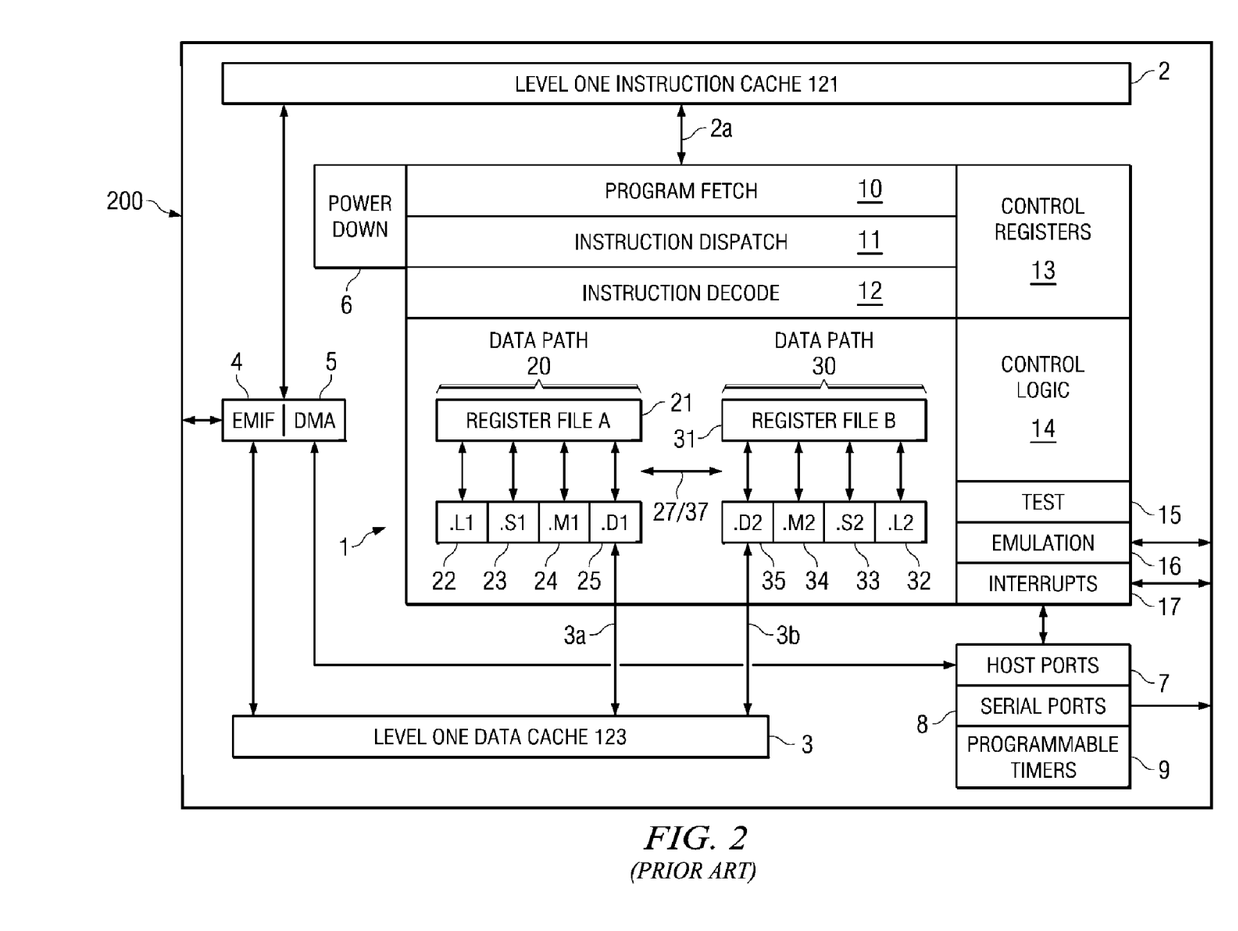
FIG. 2 illustrates details of a very long instruction word digital signal processor core suitable for use in FIG. 1 (prior art)

FIG. 2 is a block diagram illustrating details of a digital signal processor integrated circuit 200 suitable but not essential for use in this invention (prior art). The digital signal processor integrated circuit 200 includes central processing unit 1, which is a 32-bit eight-way VLIW pipelined processor. Central processing unit 1 is coupled to level one instruction cache 121 included in digital signal processor integrated circuit 200. Digital signal processor integrated circuit 200 also includes level one data cache 123. Digital signal processor integrated circuit 200 also includes peripherals 4 to 9. These peripherals preferably include an external memory interface (EMIF) 4 and a direct memory access (DMA) controller 5. External memory interface (EMIF) 4 preferably supports access to supports synchronous and asynchronous SRAM and synchronous DRAM. Direct memory access (DMA) controller 5 preferably provides 2-channel auto-boot loading direct memory access. These peripherals include power-down logic 6. Power-down logic 6 preferably can halt central processing unit activity, peripheral activity, and phase lock loop (PLL) clock synchronization activity to reduce power consumption. These peripherals also include host ports 7, serial ports 8 and programmable timers 9.

Central processing unit 1 has a 32-bit, byte addressable address space. Internal memory on the same integrated circuit is preferably organized in a data space including level one data cache 123 and a program space including level one instruction cache 121. When off-chip memory is used, preferably these two spaces are unified into a single memory space via the external memory interface (EMIF) 4.

Level one data cache 123 may be internally accessed by central processing unit 1 via two internal ports 3a and 3b. Each internal port 3a and 3b preferably has 32 bits of data and a 32-bit byte address reach. Level one instruction cache 121 may be internally accessed by central processing unit 1 via a single port 2a. Port 2a of level one instruction cache 121 preferably has an instruction-fetch width of 256 bits and a 30-bit word (four bytes) address, equivalent to a 32-bit byte address.

Central processing unit 1 includes program fetch unit 10, instruction dispatch unit 11, instruction decode unit 12 and two data paths 20 and 30. First data path 20 includes four functional units designated L1 unit 22, S1 unit 23, M1 unit 24 and D1 unit 25 and 16 32-bit A registers forming register file 21. Second data path 30 likewise includes four functional units designated L2 unit 32, S2 unit 33, M2 unit 34 and D2 unit 35 and 16 32-bit B registers forming register file 31. The functional units of each data path access the corresponding register file for their operands. There are two cross paths 27 and 37 permitting access to one register in the opposite register file each pipeline stage. Central processing unit 1 includes control registers 13, control logic 14, and test logic 15, emulation logic 16 and interrupt logic 17.

Program fetch unit 10, instruction dispatch unit 11 and instruction decode unit 12 recall instructions from level one instruction cache 121 and deliver up to eight 32-bit instructions to the functional units every instruction cycle. Processing occurs simultaneously in each of the two data paths 20 and 30. As previously described each data path has four corresponding functional units (L, S, M and D) and a corresponding register file containing 16 32-bit registers. Each functional unit is controlled by a 32-bit instruction. The data paths are further described below. A control register file 13 provides the means to configure and control various processor operations.

Figure 3:
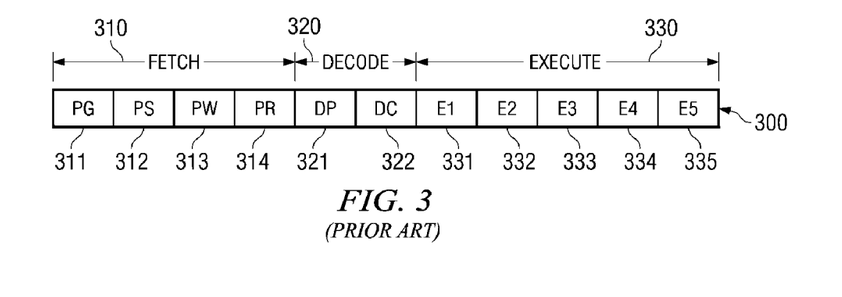
FIG. 3 illustrates the pipeline stages of the very long instruction word digital signal processor core illustrated in FIG. 2 (prior art)

FIG. 3 illustrates the pipeline stages 300 of digital signal processor core 110 (prior art). These pipeline stages are divided into three groups: fetch group 310; decode group 320; and execute group 330. All instructions in the instruction set flow through the fetch, decode, and execute stages of the pipeline. Fetch group 310 has four phases for all instructions, and decode group 320 has two phases for all instructions. Execute group 330 requires a varying number of phases depending on the type of instruction.

The fetch phases of the fetch group 310 are: Program address generate phase 311 (PG); Program address send phase 312 (PS); Program access ready wait stage 313 (PW); and Program fetch packet receive stage 314 (PR). Digital signal processor core 110 uses a fetch packet (FP) of eight instructions. All eight of the instructions proceed through fetch group 310 together. During PG phase 311, the program address is generated in program fetch unit 10. During PS phase 312, this program address is sent to memory. During PW phase 313, the memory read occurs. Finally during PR phase 314, the fetch packet is received at CPU 1.

The decode phases of decode group 320 are: Instruction dispatch (DP) 321; and Instruction decode (DC) 322. During the DP phase 321, the fetch packets are split into execute packets. Execute packets consist of one or more instructions which are coded to execute in parallel. During DP phase 322, the instructions in an execute packet are assigned to the appropriate functional units. Also during DC phase 322, the source registers, destination registers and associated paths are decoded for the execution of the instructions in the respective functional units.

The execute phases of the execute group 330 are: Execute 1 (E1) 331; Execute 2 (E2) 332; Execute 3 (E3) 333; Execute 4 (E4) 334; and Execute 5 (E5) 335. Different types of instructions require different numbers of these phases to complete. These phases of the pipeline play an important role in understanding the device state at CPU cycle boundaries.

During E1 phase 331, the conditions for the instructions are evaluated and operands are read for all instruction types. For load and store instructions, address generation is performed and address modifications are written to a register file. For branch instructions, branch fetch packet in PG phase 311 is affected. For all single-cycle instructions, the results are written to a register file. All single-cycle instructions complete during the E1 phase 331.

During the E2 phase 332, for load instructions, the address is sent to memory. For store instructions, the address and data are sent to memory. Single-cycle instructions that saturate results set the SAT bit in the control status register (CSR) if saturation occurs. For single cycle 16 by 16 multiply instructions, the results are written to a register file. For M unit non-multiply instructions, the results are written to a register file. All ordinary multiply unit instructions complete during E2 phase 322.

During E3 phase 333, data memory accesses are performed. Any multiply instruction that saturates results sets the SAT bit in the control status register (CSR) if saturation occurs. Store instructions complete during the E3 phase 333.

During E4 phase 334, for load instructions, data is brought to the CPU boundary. For multiply extension instructions, the results are written to a register file. Multiply extension instructions complete during the E4 phase 334.

During E5 phase 335, load instructions write data into a register. Load instructions complete during the E5 phase 335.

Figures 4, 5:
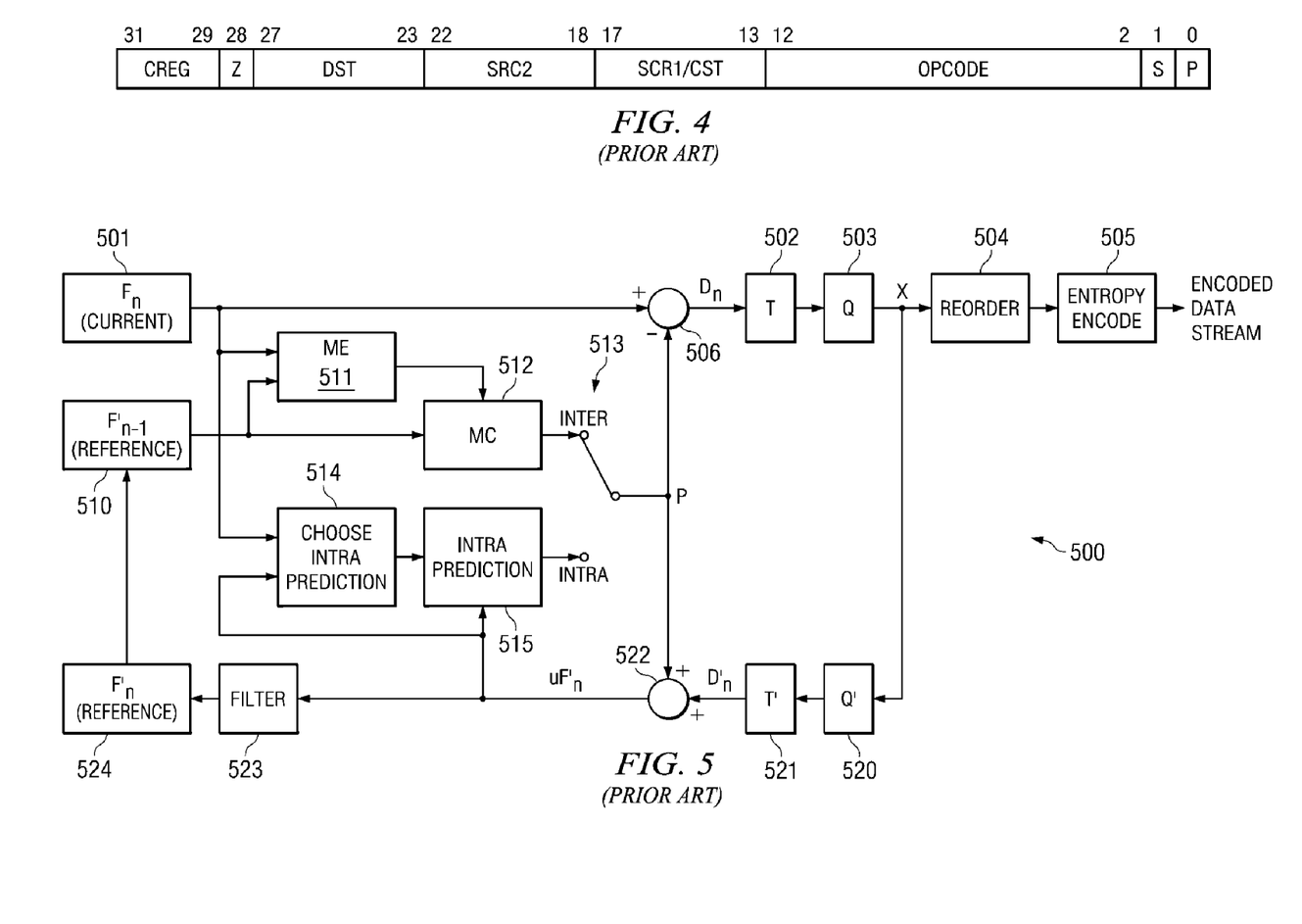
FIG. 4 illustrates the instruction syntax of the very long instruction word digital signal processor core illustrated in FIG. 2 (prior art)
FIG. 5 illustrates an overview of the video encoding process of the prior art.

FIG. 4 illustrates an example of the instruction coding of instructions used by digital signal processor core 110 (prior art). Each instruction consists of 32 bits and controls the operation of one of the eight functional units. The bit fields are defined as follows. The creg field (bits 29 to 31) is the conditional register field. These bits identify whether the instruction is conditional and identify the predicate register. The z bit (bit 28) indicates whether the predication is based upon zero or not zero in the predicate register. If z=1, the test is for equality with zero. If z=0, the test is for nonzero. The case of creg=0 and z=0 is treated as always true to allow unconditional instruction execution. The creg field is encoded in the instruction opcode as shown in Table 1.

TABLE 1

| Conditional   | creg |    |    | z |
|---------------|------|----|----|---|
| Register      | 31   | 30 | 29 | 28 |
| Unconditional | 0    | 0  | 0  | 0 |
| Reserved      | 0    | 0  | 0  | 1 |
| B0            | 0    | 0  | 1  | z |
| B1            | 0    | 1  | 0  | z |
| B2            | 0    | 1  | 1  | z |
| A1            | 1    | 0  | 0  | z |
| A2            | 1    | 0  | 1  | z |
| A0            | 1    | 1  | 0  | z |
| Reserved      | 1    | 1  | 1  | x |

Note that "z" in the z bit column refers to the zero/not zero comparison selection noted above and "x" is a don't care state. This coding can only specify a subset of the 32 registers in each register file as predicate registers. This selection was made to preserve bits in the instruction coding.

The dst field (bits 23 to 27) specifies one of the 32 registers in the corresponding register file as the destination of the instruction results.

The scr2 field (bits 18 to 22) specifies one of the 32 registers in the corresponding register file as the second source operand.

The scr1/cst field (bits 13 to 17) has several meanings depending on the instruction opcode field (bits 3 to 12). The first meaning specifies one of the 32 registers of the corresponding register file as the first operand. The second meaning is a 5-bit immediate constant. Depending on the instruction type, this is treated as an unsigned integer and zero extended to 32 bits or is treated as a signed integer and sign extended to 32 bits. Lastly, this field can specify one of the 32 registers in the opposite register file if the instruction invokes one of the register file cross paths 27 or 37.

The opcode field (bits 3 to 12) specifies the type of instruction and designates appropriate instruction options. A detailed explanation of this field is beyond the scope of this invention except for the instruction options detailed below.

The s bit (bit 1) designates the data path 20 or 30. If s=0, then data path 20 is selected. This limits the functional unit to L1 unit 22, S1 unit 23, M1 unit 24 and D1 unit 25 and the corresponding register file A 21. Similarly, s=1 selects data path 20 limiting the functional unit to L2 unit 32, S2 unit 33, M2 unit 34 and D2 unit 35 and the corresponding register file B 31.

The p bit (bit 0) marks the execute packets. The p-bit determines whether the instruction executes in parallel with the following instruction. The p-bits are scanned from lower to higher address. If p=1 for the current instruction, then the next instruction executes in parallel with the current instruction. If p=0 for the current instruction, then the next instruction executes in the cycle after the current instruction. All instructions executing in parallel constitute an execute packet. An execute packet can contain up to eight instructions. Each instruction in an execute packet must use a different functional unit.

FIG. 5 illustrates the encoding process 500 of video encoding according to the prior art. Many video encoding standards use similar processes such as represented in FIG. 5. Encoding process 500 begins with the n th (current) frame $F_n$ 501. Frequency transform block 502 transforms a macroblock of the pixel data into the spatial frequency domain. This typically involves a discrete cosine transform (DCT). This frequency domain data is quantized in quantization block 503. This quantization typically takes into account the range of data values for the current macroblock. Thus differing macroblocks may have differing quantizations. In accordance with the H.264 standard, in the base profile the macroblock data may be arbitrarily reordered via reorder block 504. As will be explained below, this reordering is reversed upon decoding. Other video encoding standards and the H.264 main profile transmit data for the macroblocks in strict raster scan order. The quantized data is encoded by entropy encoding block 505. Entropy encoding employs fewer bits to encode more frequently used symbols and more bits to encode less frequency used symbols. This process reduces the amount of encoded that must be transmitted and/or stored. The resulting entropy encoded data is the encoded data stream. This invention concerns content adaptive binary arithmetic coding (CABAC) which will be further described below.

Video encoding standards typically permit two types of predictions. In inter-frame prediction, data is compared with data from the corresponding location of another frame. In intra-frame prediction, data is compared with data from another location in the same frame.

For Inter prediction, data from n−1 th (previous) frame $F_{n-1}$ 510 and data from the n th frame $F_n$ 501 supply motion estimation block 511. Motion estimation block 511 determines the positions and motion vectors of moving objects within the picture. This motion data is supplied to motion compensation block 512 along with data from n−1 th frame $F_{n-1}$ 510. The resulting motion compensated frame data is selected by switch 513 for application to subtraction unit 506. Subtraction unit 506 subtracts the Inter prediction data from switch 513 from the input frame data from n th frame $F_n$ 501. Thus frequency transform block 502, quantization block 503, reorder block 504 and entropy encoding block 505 encode the differential data rather than the original frame data. Assuming there is relatively little change from frame to frame, this differential data has a smaller magnitude than the raw frame data. Thus this can be expressed in fewer bits contributing to data compression. This is true even if motion estimation block 511 and motion compensation block 512 find no moving objects to code. If the n th frame $F_n$ and the n−1 th frame $F_{n-1}$ are identical, the subtraction unit 506 will produce a string of zeros for data. This data string can be encoded using few bits.

The second type of prediction is Intra prediction. Intra prediction predicts a macroblock of the current frame from another macroblock of the current frame. Inverse quantization block 520 receives the quantized data from quantization block 503 and substantially recovers the original frequency domain data. Inverse frequency transform block 521 transforms the frequency domain data from inverse quantization block 520 back to the spatial domain. This spatial domain data supplies one input of addition unit 522, whose function will be further described. Encoding process 500 includes choose intra predication unit 514 to determine whether to implement Intra prediction. Choose intra prediction unit 514 receives data from n th frame $F_n$ 501 and the output of addition unit 522. Choose intra prediction unit 514 signals intra predication unit 515, which also receives the output of addition unit 522. Switch 513 selects the Intra prediction output for application to the subtraction input of subtraction units 506 and an addition input of addition unit 522. Intra prediction is based upon the recovered data from inverse quantization block 520 and inverse frequency transform block 521 in order to better match the processing at decoding. If the encoding used the original frame, there might be drift between these processes resulting in growing errors.

Video encoders typically periodically transmit unpredicted frames. In such an event the predicted frame is all 0's. Subtraction unit 506 thus produces data corresponding to the n th frame $F_n$ 501 data. Periodic unpredicted or I frames limits any drift between the transmitter coding and the receive decoding. In a video movie a scene change may produce such a large change between adjacent frames that differential coding provides little advantage. Video coding standards typically signal whether a frame is a predicted frame and the type of prediction in the transmitted data stream.

Encoding process 500 includes reconstruction of the frame based upon this recovered data. The output of addition unit 522 supplies deblock filter 523. Deblock filter 523 smoothes artifacts created by the block and macroblock nature of the encoding process. The result is reconstructed frame $F'_n$ 524. As shown schematically in FIG. 5, this reconstructed frame $F'_n$ 524 becomes the next reference frame $F_{n-1}$ 510.

There is a problem with Inter coded macroblocks. If data on a specific macroblock is lost, such as through a noisy data channel, the decoding distortion lasts longer than the lost frame. Any macroblock Inter coded with a lost macroblock loses the reference data for reconstruction. A prior art technique known as Intra refresh (IR) deals with this problem. In IR some macroblocks of each frame are forced to be Intra coded unrelated to the natural Inter/Intra coding decision made by choose Intra predication unit 514. These forced Intra coded macroblocks are not dependent upon information of prior frames breaking the temporal dependency of these macroblocks. This could increase the perceived signal to noise ratio (PSNR) in a noisy environment.

Figure 6:
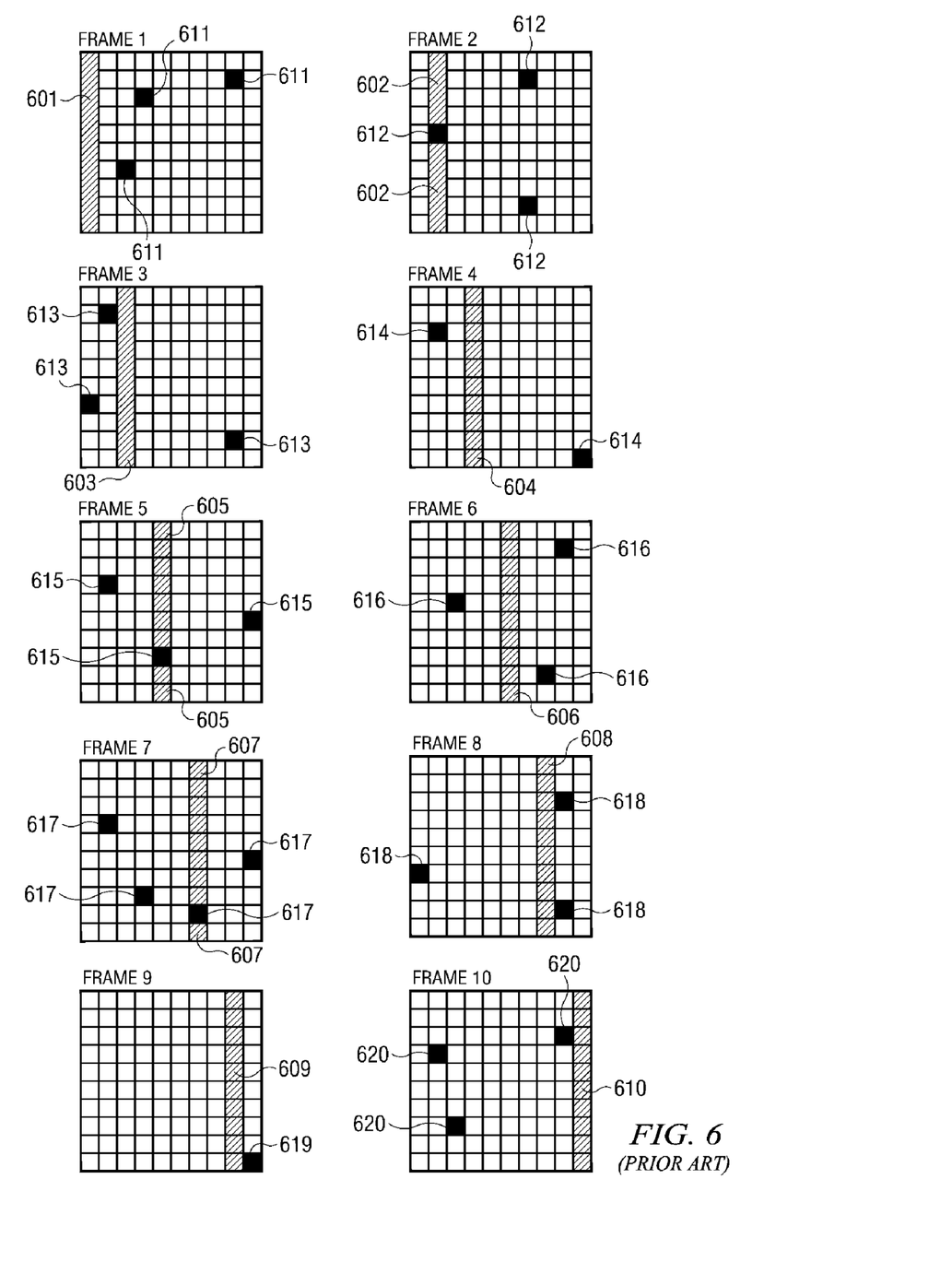
FIG. 6 schematically illustrates a prior art IR cyclic refresh technique.

FIG. 6 schematically illustrates a prior art IR cyclic refresh technique. Frames 1 to 10 illustrated in FIG. 6 are simplified examples of actual frames to illustrate the principle of the prior art technique. FIG. 6 illustrates this prior art technique applied to sequential frames 1 to 10. Frame 1 includes one column of macroblocks 601 (dark gray) which the IR technique force to be Intra coded. Macroblocks 611 (light gray) are Intra coded due to natural mode decision of choose Intra predication unit 514. For macroblocks 611 choose Intra predication unit 514 determines a similarity measure such as sum of absolute differences (SAD) favors Intra coding over Inter coding.

FIG. 6 illustrates a second column of macroblocks 602 which the IR technique force to be Intra coded. This column of macroblocks 602 is the second column of macroblocks within Frame 2. Macroblocks 611 are Intra coded due to natural mode decision of choose Intra predication unit 514. Note that Frame 2 includes on macroblock which the IR technique forces to be Intra coded which would have been Intra coded naturally. This is a possible result of the IR technique and that macroblock is Intra coded. Frame 3 includes a third column of macroblocks 603 and naturally selected macroblocks 613 which are Intra coded. Frame 4 includes a forth column of macroblocks 604 and naturally selected macroblocks 614 which are Intra coded. Frame 5 includes a fifth column of macroblocks 605 and naturally selected macroblocks 615 which are Intra coded. Frame 6 includes a sixth column of macroblocks 606 and naturally selected macroblocks 616 which are Intra coded. Frame 7 includes a seventh column of macroblocks 607 and naturally selected macroblocks 617 which are Intra coded. Note in Frame 7 as illustrated in Frame 2, a naturally selected Intra coded macroblock falls within the forced Intra coded column. Frame 8 includes an eighth column of macroblocks 608 and naturally selected macroblocks 618 which are Intra coded. Frame 9 includes a ninth column of macroblocks 609 and naturally selected macroblocks 619 which are Intra coded. Frame 10 includes a tenth column of macroblocks 610 and naturally selected macroblocks 620 which are Intra coded. This tenth column of Frame 10 is the last column in this example. For the eleventh frame this prior art IR technique again forces the first column of macroblocks to be Intra coded as shown in Frame 1. Note that Frames 1 to 10 are illustrated with one to four naturally selected Intra coded macroblocks. This is exemplary only, depending on the nature of the image of each frame there could be more or fewer naturally selected Intra coded macroblocks.

This prior art cyclic IR technique insures that each macroblock within the frame is Intra coded on a cyclic basis. In this example each macroblock is Intra coded at least once each 10 frames. The IR technique of this example has a bad subjective quality because the viewer will notice a cyclic flicker moving along with forced Intra macroblock positions. Other prior art IR techniques employ less apparent cyclic patterns forcing every macroblock to be Intra coded at least once each predetermined set of frames.

Rate distortion (RD) theory suggests that macroblocks which degrade least when moving from Inter coded type to Intra coded type should be coded as Intra type in IR for best overall signal to noise ratio. Computation of the differential RD cost requires availability of Intra and Inter coding RD costs when making coding mode decisions. Most of the real-time encoders using frame level motion estimation calculate the RD cost for only Inter modes. These encoders are typically not equipped to calculate the Intra RD cost for all the macro blocks in the frame when doing mode decision. Such real-time encoders can not decide precisely which macroblocks are best to be encoded as Intra. These prior art real-time encoders typically implement IR by selecting Intra positions either in random or in cyclic fashion. This IR strategy results in significant degradation in video quality.

This invention exploits a previously unused positive correlation between differential RD cost and Inter RD cost. Macroblocks with smaller Inter RD cost usually have smaller differential RD cost. Usually in typical video sequences macroblocks that are part of a flat region with moderate motion generate a smaller sum of absolute difference (SAD). These macro blocks typically also generate lesser SAD and fewer bits for the same quantization table when Intra coded. This invention Intra codes the macroblocks in each frame with the least SAD. This invention uses an adaptive threshold to penalize macroblocks based on average frame level SAD and repetition factor to maintain minimum repetition of Intra coding the same positions. After a time interval of few seconds, macroblocks not previously Intra coded are Intra coded to have the same error concealment capability as random or cyclic IR. This completes one cycle of Intra refresh which is repeated to span entire video sequence.

Figure 7A:
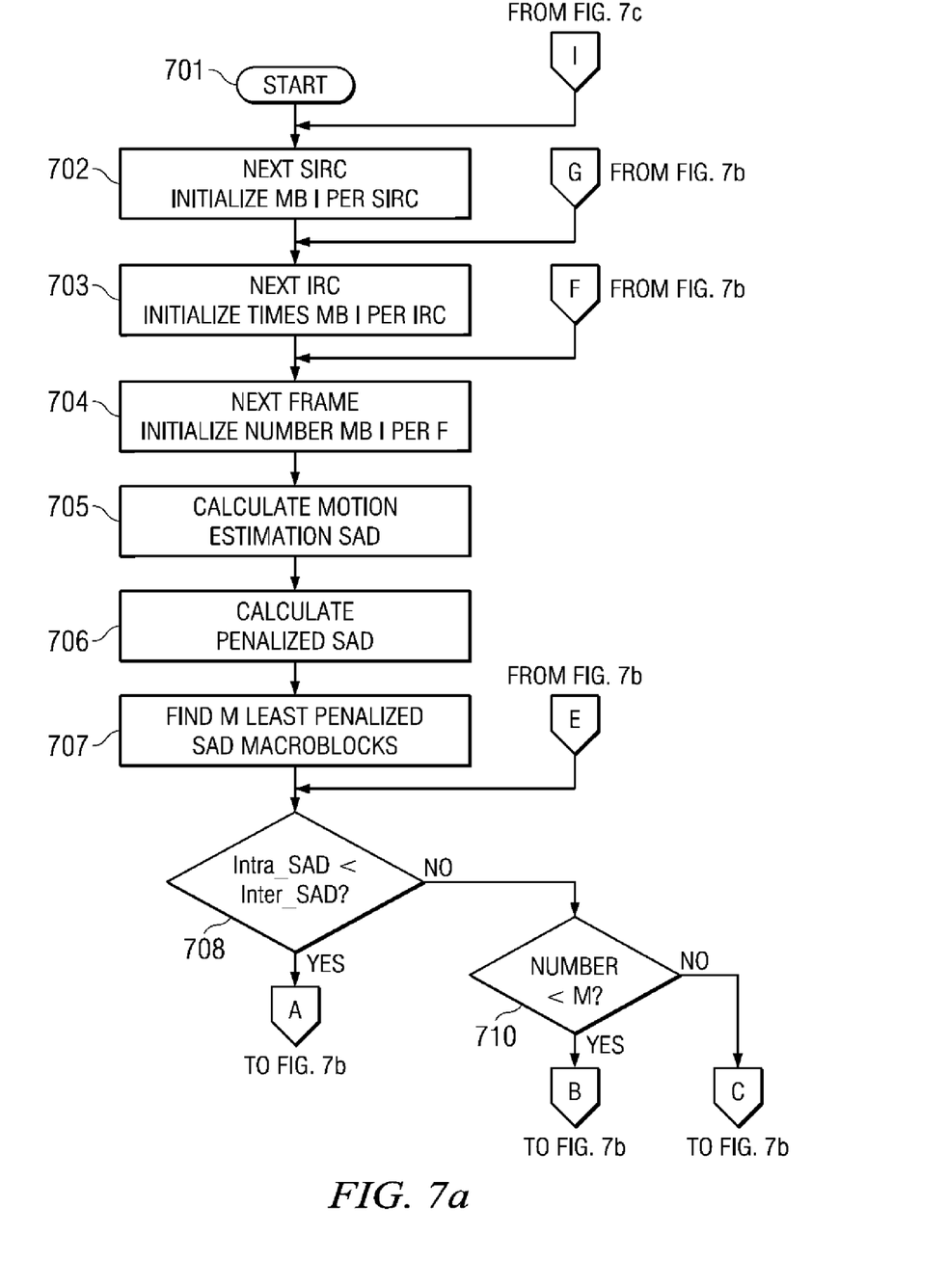
FIGS. 7a, 7b and 7c together illustrate a flow chart of the intra/inter coding decision process of this invention.
Figure 7B:
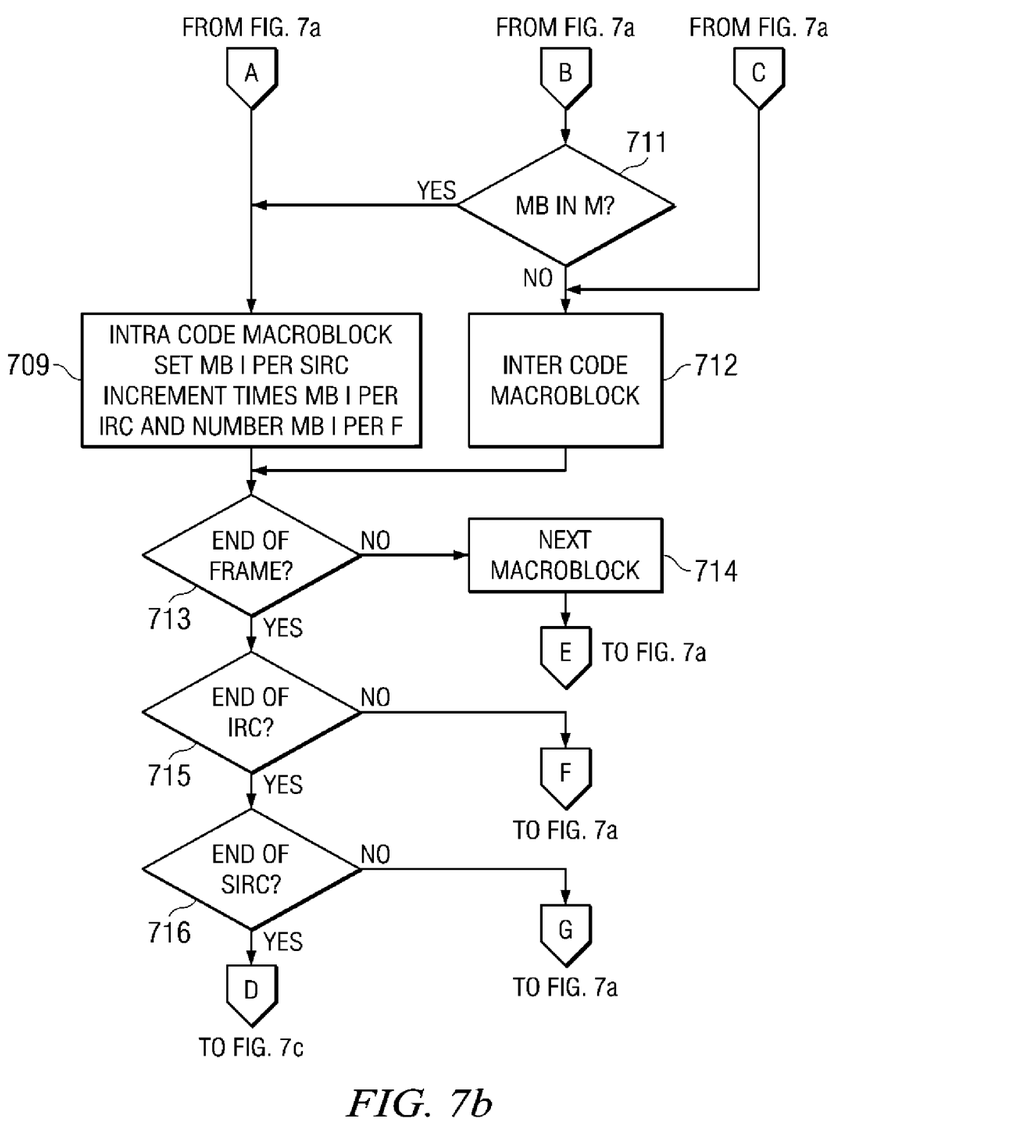
Figure 7C:
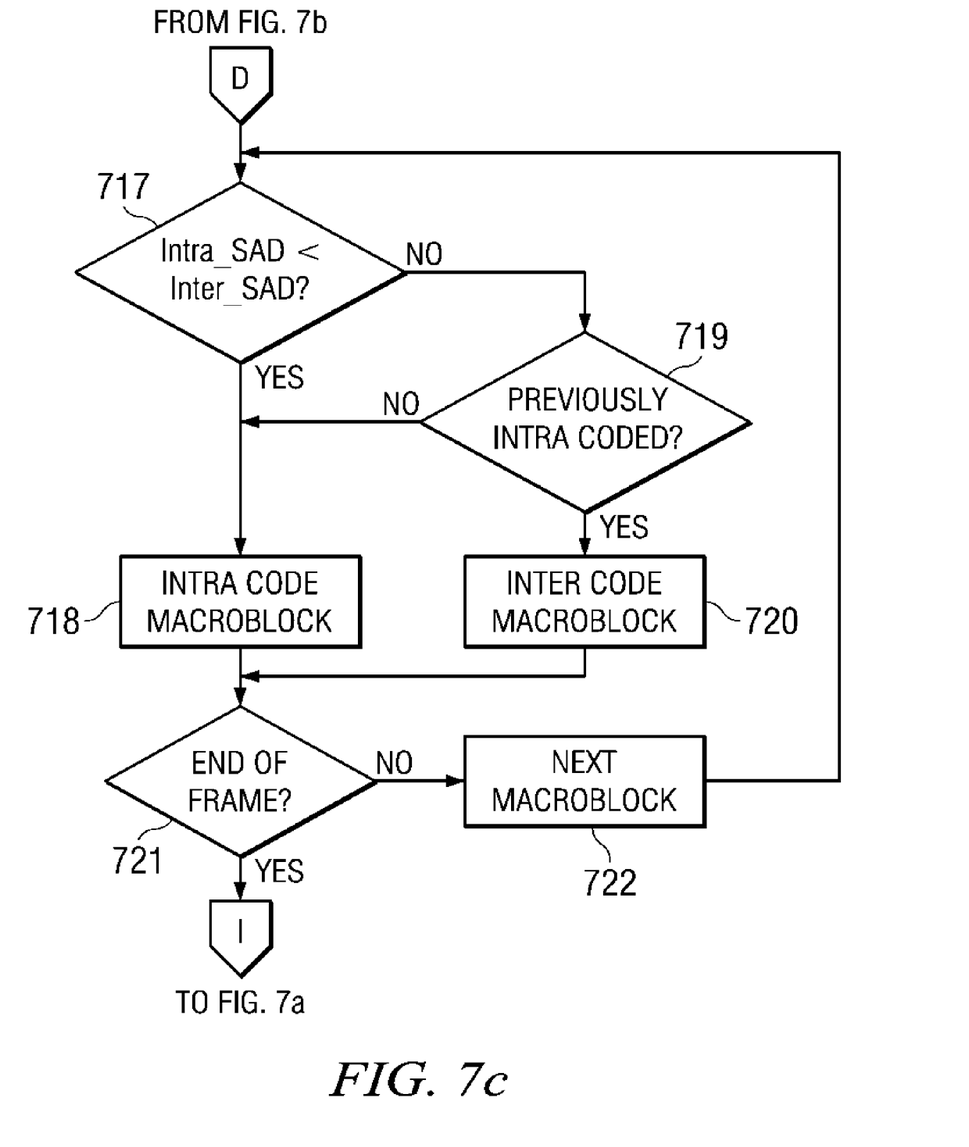

FIGS. 7*a*, 7*b* and 7*c* together illustrate a flow chart of the intra/inter coding decision process of this invention. This flow chart implements choose intra prediction unit 514 of FIG. 5. Note that the flow chart of FIGS. 7*a*, 7*b* and 7*c* illustrates a closed loop process. In actuality the data processor implementing this invention must also implement the other processes illustrated in FIG. 5 in a time sharing manner with the process of this invention. Properly organizing program code to implement the complete process of FIG. 5 including this invention illustrated in FIGS. 7a, 7b and 7c is within the capability of one of ordinary skill in the art and will not be further described.

This invention uses two sets of video frames. One of these sets is called an Intra refresh cycle (IRC). Such an IRC in described in conjunction with the description of the prior art of FIG. 6. A second set of frames called a Super Intra refresh cycle (SIRC) is used in this invention. Each SIRC includes one or more IRCs. This SIRC is used in a manner detailed below.

The process of this invention begins with start block 701. In block 702 the process initializes an array whose elements indicate whether a corresponding macroblock has been Intra coded during the current SIRC. In the preferred embodiment each element within this array has a first digital state when the corresponding macroblock has not been Intra coded in the current SIRC. This element has an opposite digital state when the corresponding macroblock has been Intra coded in the current SIRC. This array is initialized at the start of each new SIRC to indicate that no macroblock has been Intra coded.

Block 703 begins a new IRC. Block 703 initializes an array whose elements indicate the number of times a corresponding macroblock has been Intra coded in the current IRC. In the preferred embodiment each element in this array has a number indicating how many times the corresponding macroblock has been Intra coded in the current IRC. This array is initialized to all zeros at the start of each new IRC to indicate that no macroblock has been Intra coded.

Block 704 begins a new frame. Block 704 initializes a variable indicating the number of macroblocks that have been Intra coded in the current frame. In the preferred embodiment thin variable is a number. This variable is initialized to zero at the start of each new frame to indicate that no macroblock has been Intra coded.

Block 705 calculates the motion estimation measure of similarity to determine the motion vector for inter prediction coding for each macroblock of a current frame. The preferred embodiment uses the sum of absolute differences (SAD) as the similarity measure. This process includes some of the computations for motion estimation block 511 illustrated in FIG. 5.

Block 706 calculates a penalized SAD from the motion estimation SAD and the number times a macroblock has been Intra coded in the current IRC. In the preferred embodiment a penalized SAD is calculated for each macroblock in the current frame. This is preferably calculated as follows:

PenalSAD[mb]=ME_SAD[mb]+NumTimes[mb]*PF where: PenalSad[mb] is the penalized SAD value for the current macroblock to be calculated; ME_SAD[mb] is the previously calculated motion estimation SAD for the current macroblock; NumTimes[mb] is the number of times the current macroblock position was Intra coded in the current IRC; and PF is a predetermined constant penal factor.

Block 707 produces a list of the M macroblocks having the least PenalSAD[mb]. Due to the above calculation of Penal-SAD[mb], these M macroblocks tend to be those which have not been Intra coded in the current IRC. Note that this list of M macroblocks is updated for each frame while the array variable NumTimes[mb] is kept for an entire IRC.

Block 708 tests to determine if the similarity measure for Intra coding Intra_SAD is less than the similarity measure of Inter coding Inter_SAD for a current macroblock. This is the normal Intra/Inter coding decision previously made by choose inter prediction unit 514. This test determines whether the bit cost of Intra coding is less than the bit cost of Inter coding. In this example this determination is based upon sum of absolute values (SAD) as a similarity measure. Other similarity measures are known in the art and could be used here. If this is true (Yes at decision block 708), then the process continues to block 709. Block 709 intra codes the current macroblock. Block 709 also updates the variables. Block 709 sets the array element to indicate the macroblock has been Intra coded during the current SIRC. Block 709 increments the number of times a macroblock has been Intra coded in the corresponding variable. Block 709 also increments the element the array indicating the number of times the corresponding macroblock has been Intra coded in the current IRC. This completes processing for the current macroblock.

If the similarity measure for Intra coding Intra_SAD is not less than the similarity measure of Inter coding Inter_SAD for a current macroblock (No at decision block 708), then the process continues to block 710. Block 710 tests to determine if the number of macroblocks intra coded in the current frame is less than M. M is the number of least PenalSAD[mb] listed in block 707. If the number of macroblocks intra coded in the current frame is less than M (Yes at block 710), then the process continues at block 711. Block 711 determines if the current macroblock is one of the M macroblocks of the list of block 707. If the current macroblock is on the list of M least PenalSAD macroblocks (Yes at decision block 711), then the process continues at block 709. Block 709 Intra codes the current macroblock and updates the variables.

If the number of macroblocks intra coded in the current frame is not less than M (No at block 710) or if the number of macroblocks intra coded in the current frame is less than M (Yes at block 710) and the current macroblock is not on the list of M least PenalSAD macroblocks (No at decision block 711), then the process continues at block 712. Block 712 inter codes the current macroblock. Block 712 does not update any of the variables.

Following coding of the current macroblock either by block 709 (Intra coding) or block 712 (Inter coding), block 713 determines if the current macroblock was the end of a frame. If the current macroblock was not the end of a frame (No at decision block 713), then block 714 advances to the next macroblock in the frame. Flow continues at block 708 for processing this new macroblock.

If the current macroblock was the end of a frame (Yes at decision block 713), then block 715 determines if the frame was the end of an IRC. If the frame was not an end of an IRC (No at decision block 715), then flow proceeds to the next frame at block 704. If the frame was an end of an IRC (Yes at decision block 715), then flow proceeds to block 716. Block 716 determines if the IRC was the end of a SIRC. If the IRC was not an end of an SIRC (No at decision block 716), then flow proceeds to the next IRC at block 703. If the frame was an end of an SIRC (Yes at decision block 716), then flow proceeds to block 717.

Block 717 begins a new frame at the end of the SIRC. Block 717 tests to determine if the similarity measure for Intra coding Intra_SAD is less than the similarity measure of Inter coding Inter_SAD for a current macroblock. This normal Intra/Inter coding decision of choose inter prediction unit 514 is similar to decision block 708. If this is true (Yes at decision block 717), then the process continues to block 718. Block 718 intra codes the current macroblock. Block 718 does not update the variables updated in block 709 because it is not needed.

If the similarity measure for Intra coding Intra_SAD is not less than the similarity measure of Inter coding Inter_SAD for a current macroblock (No at decision block 717), then the process continues to block 719. Decision block 719 consults the array element indicating whether the current macroblock position was Intra coded in the current SIRC. If none of the corresponding macroblocks have been Intra coded (No at decision block 719), then flow continues at block 718 to Intra code the current macroblock. If at least one corresponding macroblock has been Intra coded (Yes at decision block 719), then flow continues at block 720 to Inter code the current macroblock.

Following coding of the current macroblock either by block 718 (Intra coding) or block 720 (Inter coding), block 721 determines if the current macroblock was the end of a frame. If the current macroblock was not the end of a frame (No at decision block 722), then block 722 advances to the next macroblock in the frame. Flow continues at block 717 for processing this new macroblock. If the current macroblock was the end of a frame (Yes at decision block 721), then the current SIRC is complete. Flow proceeds to the next SIRC at block 702.

The Intra Refresh Cycle (IRC) is sequence of frames needed to refresh entire frame. For example for QCIF, IRC is 99/4 or 25 frames. The Super Intra Refresh Cycle (SIRC) as set of N IRCs. The invention determines which macroblocks to be Intra coded in each frame. If the total number of naturally selected Intra coded macroblocks is less than M, block 710 ensures that at least M macroblocks are Intra coded. Block 711 selects these extra Intra coded macroblocks from the M macroblocks having the least PenalSAD values. The addition of the Penalty Factor for macroblocks whose corresponding positions have already been Intra coded biases this set of macroblock positions toward those that have not yet been Intra coded in the current IRC. The extra frame at the end of a SIRC Intra codes those macroblocks naturally selected (decision block 717) and those macroblocks whose positions have not been Intra coded in the SIRC (decision block 719). This final frame makes sure that all macroblock positions are Intra coded at least once in each SIRC.

This invention uses the correlation between differential RD cost with Inter RD cost to select Intra macroblock positions in each frame. This invention uses an adaptive threshold to minimize repetition of the positions coded as Intra in earlier frames based on repetition factor and average frame SAD. This invention uses non-cyclic refresh resulting in better video quality with respect to prior art cyclic refresh with no additional computation complexity and the same capability for error concealment.

What is claimed is:

1. A method of video coding comprising:
intra prediction coding at least a predetermined constant M macroblocks within an ordinary frame, said at least said M macroblocks including
  macroblocks for which a bit cost of intra prediction coding is less than a bit cost of inter prediction coding, and
  optional additional macroblocks for which the bit cost of intra prediction coding is not less than the bit cost of inter prediction coding selected from a set of optionally intra prediction coded macroblocks having least bit cost of inter prediction coding, said set of optionally intra prediction coded macroblocks for which the bit cost of intra prediction coding is not less than the bit cost of inter prediction coding determined by
    counting a number of times each corresponding macroblock position is intra prediction coded in a predetermined number of frames,
    calculating a similarity measure for inter prediction coding of each macroblock in a current frame,
    adjusting said similarity measure for inter prediction coding for each macroblock in said current frame by adding a product of a penalty factor and a number of times a corresponding macroblock position was intra prediction coded in said predetermined number of prior frames to said calculated similarity measure,
    selecting M macroblocks having least adjusted similarity measures.

2. The method of claim 1, further comprising:
for an end frame following a predetermined number of ordinary frames, intra prediction coding each macroblock where no corresponding macroblock was intra prediction coded in said predetermined number of ordinary frames.

3. The method of claim 1, further comprising:
selecting a macroblock as an optional additional intra prediction coded macroblock if
  said bit cost of intra prediction coding is not less than said bit cost of inter prediction coding,
  a number of macroblocks selected for intra prediction coding in the current frame is less than M, and
  said macroblock is within said set of optionally intra prediction coded macroblocks.

* * * * *